May 6, 1941.  R. L. GILL  2,240,768
AUTOMOBILE WINDOW OPERATING DEVICE
Filed April 19, 1939  2 Sheets-Sheet 1
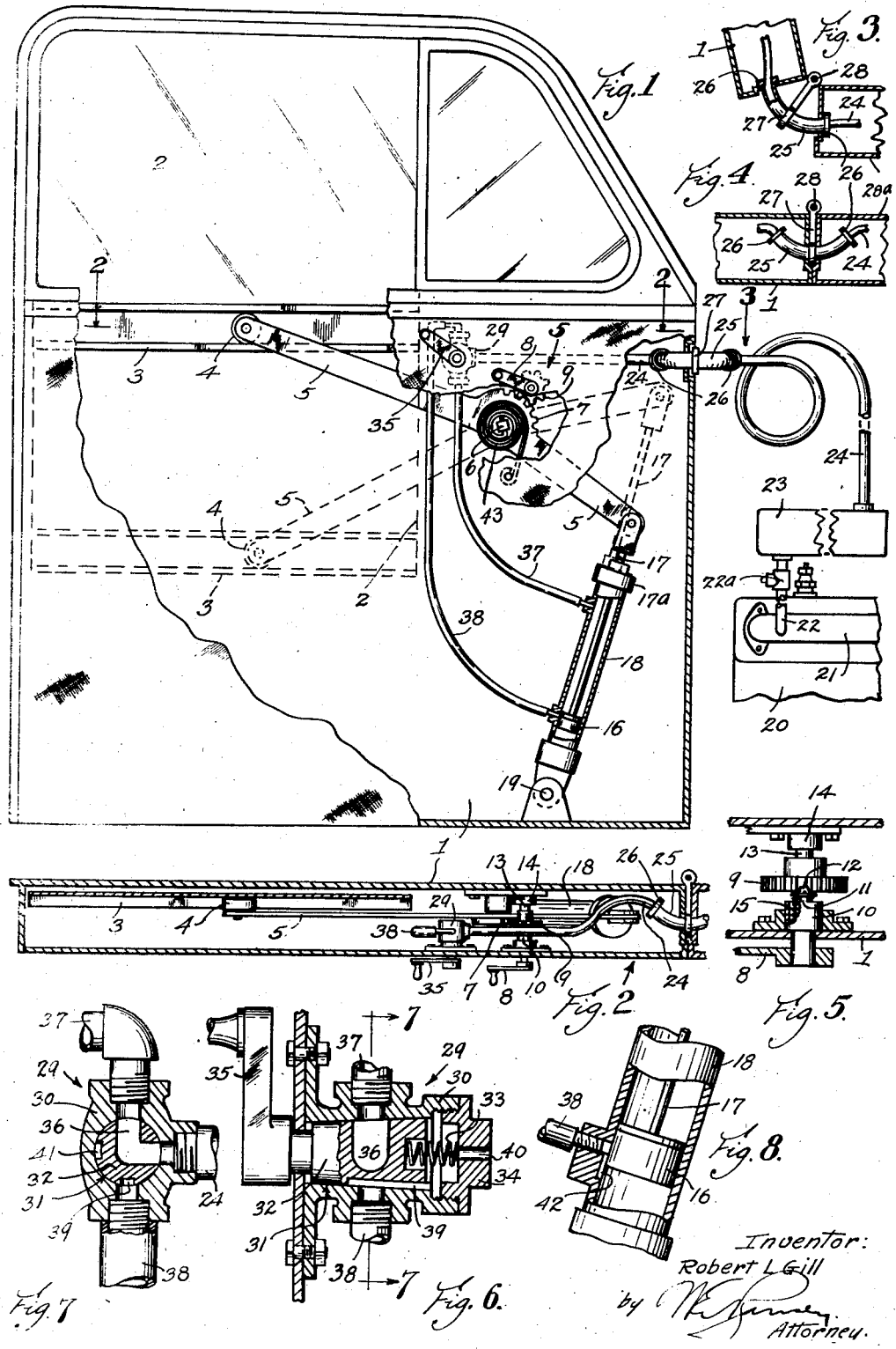

May 6, 1941.  R. L. GILL  2,240,768
AUTOMOBILE WINDOW OPERATING DEVICE
Filed April 19, 1939  2 Sheets-Sheet 2
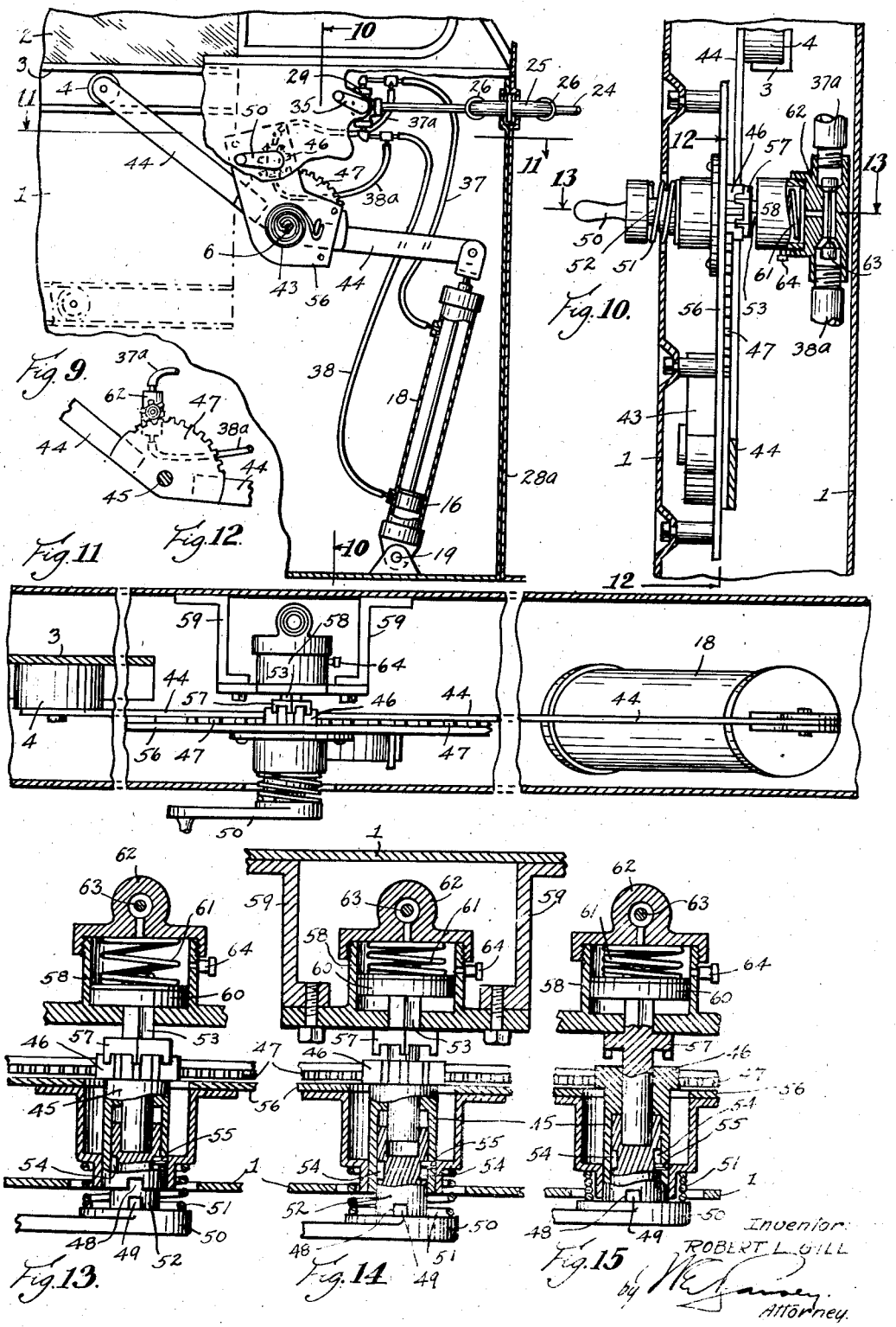

Patented May 6, 1941

2,240,768

UNITED STATES PATENT OFFICE 2,240,768

AUTOMOBILE WINDOW OPERATING DEVICE

Robert L. Gill, Ridgefield, Wash.

Application April 19, 1939, Serial No. 268,650

3 Claims. (Cl. 268—125)

My invention relates to automobiles and more particularly to means for quickly and conveniently opening the window thereof next the driver's seat to enable the driver to extend his arm as a signal, and for closing said window. It is well known that automobile drivers frequently neglect to give hand signals because of the difficulty involved in opening the window. Frequently such neglect is due to the lack of time available after it is decided to turn or stop the automobile, but in other cases the window is not opened to give a signal even when there is ample time because to do so would distract the driver's attention from his driving. There has long been a need for a device that would open or close the driver's window with as little attention on his part as is required to sound the horn or to perform the other similar acts incidental to automobile driving.

It has heretofore been proposed to utilize the vacuum produced by an automobile engine for raising and lowering the windows of the automobile. However, the operation of the heretofore proposed devices has not been satisfactory, for one reason, because they have not been sufficiently rapid, and, for another reason, because they have not exerted sufficient force to operate a window that tends to stick.

The principal object of my invention is to provide a vacuum operative device for raising and lowering a window of an automobile, said device including a vacuum storage tank. When the vacuum produced by an automobile engine is utilized to do work, an amount of air proportionate to the work being done must be drawn into the intake manifold. Since the amount of air that may be so drawn into said manifold without interfering with the operation of said engine is limited, it is necessary that some vacuum be stored if work is to be done at a sufficiently fast rate to open and close a window as quickly as I deem to be desirable. In this way, a considerable amount of energy may be made available in a very short time, said energy being supplied by the engine over a longer period of time. Also, the vacuum storage tank permits automatic operation of the window when the engine is not running.

A further object of my invention is to provide means for rapidly, but smoothly, decelerating a window, and its operating mechanism, at the end of its stroke. Said window, and the parts that move therewith, have considerable inertia and I desire them to move at high speed throughout as much as possible of their range of movement in order that said window may be opened or closed quickly. But I wish to avoid excessive jarring when said window reaches the end of its travel, either at the top or bottom. Said jarring might break the glass of said window, or it might damage other parts thereof, or of the operating mechanism. To this end, I provide cushioning means for decelerating said window smoothly at and near the end of its travel.

A further object of my invention is to provide pneumatic cushioning means for a vacuum operative window opening and closing device. Said pneumatic cushioning means may advantageously be included in the vacuum cylinder of said device.

A further object of my invention is to provide pneumatic cushioning means for a vacuum operative window opening and closing mechanism in which air is admitted to the cushioning chamber to move a piston when vacuum is applied to the opposite side thereof, thus accelerating said piston rapidly at the beginning of its stroke where it might otherwise be sluggish in starting. I attain said object by providing a small groove along the inner wall of said cushioning chamber adapted to admit air thereto, said groove being so small as to interfere with said cushioning action only to a slight degree.

A further object of my invention is to provide a lock for an automobile window to prevent theft of said automobile, or its contents, said lock being adapted to operate automatically to prevent opening said window without interfering with the operation of either a hand crank or a vacuum operative opening and closing mechanism. It is necessary that said window be operable by hand crank, or similar device, independently of said vacuum operative mechanism, although said hand crank should normally be in a disengaged position so it will not interfere with said mechanism.

Said lock must be automatically disengaged under these conditions; at all other times it should prevent movement of said window. First, it should be disengaged when said window is being operated by said hand crank. Second, it should be disengaged when vacuum is applied to said vacuum operative mechanism to lower said window. Third, it should be disengaged when vacuum is applied to raise said window. It should lock said window when no vacuum is applied to said mechanism, either because the control valve is in a neutral position or because no vacuum is available from the engine.

I attain said object by providing a pinion for engaging a rack connected to said window, and a locking dog to prevent rotation of said pinion, said dog being disengageable by a special vacuum cylinder or by a hand crank. Said window can not then be opened from outside the automobile when the vacuum is below a certain predetermined value because of said lock, and it can not be opened from the outside when said vacuum is above said value because of said vacuum operative mechanism.

A further object of my invention is to provide articular means for conducting vacuum across the hinged joint between an automobile door and the adjacent frame. The necessity for said means arises from the tendency of a hose, or other conduit, either to collapse from bending or from being pinched, in case said hose is highly flexible, or to crack in case it is less flexible. By the means hereinafter described and illustrated, both cracking and collapsing are effectively avoided.

Other objects and advantages of my invention will be described with reference to the accompanying drawings in which Fig. 1 is a side elevation of an automobile door, taken from the inside of said automobile, with portions of the inner wall of said door shown broken away to disclose a window operating device embodying my invention, the vacuum storage tank thereof and the hose leading to the automobile motor being shown more or less diagrammatically;

Fig. 2 is a horizontal section taken on the line 2—2 of Fig. 1;

Fig. 3 is a fragmentary detail view taken in the direction of the arrow 3 in Fig. 1 showing means for conducting vacuum across the hinged door joint, said door being shown in its open position;

Fig. 4 is a view similar to Fig. 3 except that the door is shown in its closed position;

Fig. 5 is a fragmentary sectional view taken in the direction of the arrow 5 in Fig. 1 showing the manner in which the hand crank may be engaged or disengaged;

Fig. 6 is a sectional view of the control valve of Fig. 1;

Fig. 7 is a sectional view taken on the line 7—7 of Fig. 6;

Fig. 8 is an enlarged fragmentary detail view of the lower end portion of the vacuum cylinder shown in Fig. 1, showing a groove in the inner wall of said cylinder for admitting air to the cushioning chamber thereof;

Fig. 9 is a fragmentary side elevation of an automobile door embodying a modification of my invention which includes a lock for the window of said door;

Fig. 10 is a vertical sectional view taken along the line 10—10 in Fig. 9;

Fig. 11 is a large scale foreshortened horizontal sectional view taken along the line 11—11 in Fig. 9;

Fig. 12 is a fragmentary sectional view taken along the line 12—12 in Fig. 10;

Fig. 13 is an enlarged fragmentary sectional view taken along the line 13—13 in Fig. 10, the lock mechanism being shown in its engaged position;

Fig. 14 is a view similar to Fig. 13 with said lock mechanism shown disengaged by a special vacuum cylinder; and Fig. 15 is a view similar to Fig. 13 with said lock mechanism shown disengaged by the hand crank.

A window operating device embodying my invention may be attached to an automobile door 1 having a window 2 carried by holder 3 adapted to serve as a way for roller 4. The aforesaid structure is in common use on automobiles. However, I replace the lever that ordinarily carries said roller, to raise or lower said window, with lever 5 pivotally mounted on said door by pin 6, which is fixedly secured to said lever, as is shown more clearly in Fig. 1. A circular rack, or gear segment, 7 may, if desired, be formed integrally with said lever; and crank 8 co-operating with pinion 9 is adapted to rotate said lever about pivot 6, thereby to raise or lower said window. This construction is much the same as that ordinarily used to raise or lower a window manually, except that said crank is normally disengaged from said pinion, being engageable therewith when pressed inwardly, toward the door. Said crank is affixed to sleeve 10 having a protuberance 11 adapted to engage notch 12 in said gear when said crank is pressed inwardly. Said sleeve is adapted to bear on spindle 13 to which is attached pinion 9, said spindle being journaled in bracket 14 which is secured to said door. Spring 15 is adapted normally to hold said crank out of engagement with said rack.

Piston 16, carried by rod 17 which is pivotally connected to lever 5, is adapted to operatively engage cylinder 18 and to be moved therein by atmospheric pressure when a vacuum is applied to the opposite side thereof. The word "vacuum," as used herein, is intended to mean any air pressure less than the current atmospheric pressure. Said cylinder should be pivotally mounted on pin 19, which may be fixedly secured to said door. Cap 17a which may be threaded on cylinder 18 is adapted to carry packing for said rod.

Engine 20 is adapted to form a vacuum in intake manifold 21. Tube 22 may be attached to said manifold in any suitable way to connect the latter with tank 23 in which vacuum may be stored, that is, the air pressure in said tank may be maintained substantially below the current atmospheric pressure by said engine. Said tank may be large enough to supply vacuum for operating said window several times without running said engine. I prefer to make said tube 22 sufficiently small so that air drawn therethrough by said engine will not interfere with the operation thereof. On the other hand, I prefer to make tube 24 large enough to make the vacuum in said tank quickly available to operate said piston 16.

Inasmuch as the window of an automobile adjacent the driver's seat is usually mounted in a door adapted to swing open, it becomes necessary to conduct a vacuum across the hinged joint of said door if the window therein is to be operated by vacuum produced by the engine. This is a matter of difficulty largely because the external pressure on whatever conduit is used will be greater than the internal pressure thereon, thus tending to crush said conduit. This is an unavoidable difficulty in conducting vacuum. I prefer to conduct said vacuum across said joint by means of ordinary flexible vacuum tubing 24, and to support said tubing at said joint by passing it through a hollow, more or less rigid tube 25, preferably curved in the form of an arc. Said curved tube may be positioned, when said door is closed, so that it lies one-half within said door and one-half within the automobile body 28a adjacent thereto, as is shown more clearly in Fig. 4. When said door is opened, said curved tube will then extend between said body and the edge of said door, as is shown more clearly in Fig. 3, and rims 26 may be formed on the ends of said curved tube, if desired, to act as stops to limit the swing of said door.

It is desirable to support said curved tube substantially at its midpoint for two reasons. First, to prevent said midportion dropping down when the door is opened to a position where it would act as an obstruction to closing said door. Second, when said door is closed, to prevent said curved tube working longitudinally to a position where it might squeeze said flexible tube 24 against the door or body member, or where it might cause said flexible tube to bend too sharply. I prefer to so support said curved tube by means of a bracket 27 affixed thereto and pivotally mounted, preferably on one of the pins 28 of the door hinge. I prefer to make said curved tube of steel, whereas flexible tube 24 may be made of a rubber compound, if desired. Said curved tube should be arranged to avoid forming sharp bends in tube 24.

Said tube 24 is adapted to conduct vacuum from tank 23 to valve 29 which may be fixedly secured to said automobile door 1. Said valve comprises a body member 30 have a tapered bore 31 into which plug 32 is adapted to fit snugly and to be thrust therein by spring 33 bearing against cap 34 threaded into said body 30. Said plug carries at its other end handle 35 by which it may be manually rotated. A passageway 36 in said plug is adapted to connect vacuum tube 24 alternately, when said plug is turned, to either of two tubes 37 or 38. Tube 37 is connected to the upper end of cylinder 18 and, when plug 32 is in the position shown in Fig. 7, is adapted to apply vacuum thereto to lift piston 16 to open window 2. When said plug is turned 90° in a clockwise direction, as viewed in Fig. 7, vacuum will be applied to the lower end of said cylinder 18 by tube 38 and piston 16 will move down to close said window.

Said plug 32 is also provided with a groove 39 adapted to admit air, at atmospheric pressure, to tube 38 and the lower end of cylinder 18, when plug 32 is turned to the position shown in Fig. 7, said air being effective to force piston 16 upward to open said window. A hole 40 is provided in cap 34 to admit air to said groove. Similarly, when plug 32 is rotated 90° in a clockwise direction from the position in which it is shown in Fig. 7, groove 41 in said plug admits air to the top part of said cylinder to force said piston downward to close said window. If said plug is turned substantially 45° in either direction from the position in which it is shown in Fig. 7, it will be in a neutral position and both of tubes 37 and 38 will be closed.

In order that said window may be opened as quickly as possible, I prefer to exert considerable force on piston 16, by the means hereinbefore described, to accelerate the same to a high velocity. In order that said piston may travel at high speed for substantially the full length of said cylinder, it is necessary that it be decelerated rapidly at the end thereof. To bring about said deceleration rapidly, but smoothly, I prefer to attach tubes 37 and 38 some distance from the end of cylinder 18 thereby to leave cushioning chambers between said tubes and the ends of said cylinder.

Said cushioning chambers must be of substantial volume inasmuch as the air therein will be under reduced pressure when the cushioning action begins, that is, when piston 16 travels past the ends of said tubes. If, soon after a small quantity of air is compressed within one of said cushioning chambers, vacuum is applied to move said piston away therefrom, said compressed air will quickly cause said piston to move. However, if the mechanism is allowed to stand for some time after compressing said air during the cushioning action so that part of said air leaks out of said cushioning chamber, the force exerted on said piston will be insufficient to move it quickly; it would move more quickly if air at atmospheric pressure were admitted to said chamber. To this end, I provide a groove 42 leading from said chamber to tube 38, which opens to the outside when piston 16 is to be raised. However, said groove 42 should be so small that very little air will leak therethrough when piston 16 is being cushioned as it descends. Said groove may be made sufficiently small for this purpose since said piston descends at high speed and a slight leakage does not interfere with the cushioning action. On the other hand, said leakage is advantageous in that it tends to prevent rebound due to the compression of air in said chamber.

I deem it of greater importance that said groove for admitting air to said cushioning chamber be provided at the lower end of said cylinder than at the top because, when piston 16 is at the bottom, spring 43 is unwound, whereas when said piston is at the top, said spring is under more tension and it therefore aids in the rapid acceleration of said piston. I prefer that said spring 43 have only sufficient stiffness to hold window 2 up in its closed position. The inner end of said spring may be fixedly secured to lever 44 and its outer end may be anchored to a member 56 secured to said window.

The modification of my invention shown in Figs. 9 to 15 differs from that hereinbefore described principally in that, in said modification, a lock is provided for the window. Also, lever 44 is so shaped that better utilization of the space between the two walls of the automobile door is achieved. Said lever permits cylinder 18 to work through a longer stroke, alongside window 2 rather than below said window.

For locking said window, I provide a sleeve 45 carrying a pinion 46 adapted to continually engage rack 47 which is integral with lever 44. Said sleeve has a slot 48 adapted to engage lug 49 on hand crank 50, when the latter is thrust inward against compression spring 51, whereby the window may be manually raised or lowered by turning said crank. Said crank will normally be disengaged by said spring in order that said window may be operated freely by vacuum cylinder 18. I prefer to make shaft 52, to which said crank is secured, hollow to bear on shaft 53, hereinafter described, and to provide a groove 54 in said shaft 52 adapted to engage pin 55 to hold said crank in place. Said pin 55 may be press fitted in sleeve 45.

Shaft 53 carries fixedly secured to its middle portion, a locking dog 57 adapted to engage pinion 46 to prevent rotation thereof and thus to prevent movement of said window. Said shaft 53 may be provided with a square section adjacent said dog adapted to engage a square hole in cylinder 58 which may be mounted on said door by means of brackets 59. The purpose of the square section of shaft 53 and the square hole in said stationary cylinder is to permit said shaft to slide longitudinally, but to prevent its rotation.

Affixed to said shaft 53 and co-operating with said cylinder is piston 60 against which spring 61 bears to normally thrust said dog 57 into engagement with pinion 46 to lock said window. However, when vacuum is applied to said cylinder said piston is drawn back, compressing said spring 61 and disengaging dog 57 to allow movement of said window. Vacuum may be applied to said cylinder through either of tubes 37a or 38a, connected to tubes 37 and 38, respectively, so that said locking dog will be disengaged automatically when said vacuum is applied to cylinder 18 either to raise or lower said window.

As hereinbefore described, when vacuum is applied through one of tubes 37 or 38, air is admitted to the other. To keep said tubes separate so that air will not be admitted to the tube conducting vacuum, and at the same time to permit vacuum from either of said tubes to be applied to cylinder 58, I provide a double acting valve 62 connected to said cylinder. When vacuum is applied to tube 38a, plunger 63 assumes the position in which it is shown in Fig. 10, closing tube 37a and preventing air from flowing therefrom into said cylinder. When vacuum is applied through tube 37a, said plunger will be lifted up to close tube 38a, at the same time opening tube 37a into said cylinder. Thus, the aforesaid locking device will not interfere with the raising or lowering of said window by vacuum cylinder 18, although said window will normally be locked.

It is also necessary that said locking dog be disengaged when hand crank 50 is used to raise or lower said window. To this end, I make shaft 53 of such length that, when said crank is pushed inward to engage sleeve 45, shaft 52 pushes shaft 53 endwise to disengage said locking dog 57. To facilitate this operation, I provide a check valve 64 adapted to permit air to escape from said cylinder, but to prevent air flowing into said cylinder. Said check valve is desirable in order that said hand crank may readily be used with handle 35 in neutral position, if air has leaked into cylinder 58. It then becomes necessary to let said air escape from said cylinder before said crank can be pushed into operating position.

In operation, my invention is adapted to move a window up or down any desired amount. To raise said window, it is merely necessary to move handle 35 away from its neutral position a slight amount, whereupon said window will be quickly raised. It may be raised all the way up, or it may be stopped at any desired position merely by returning said handle to its neutral position. By turning said handle the other way from its neutral position, said window will be quickly lowered any desired amount. With said handle in its neutral position, said window will remain stationary because of the vacuum in cylinder 18, or, if said vacuum should leak away, it will be locked by locking dog 57, or if it is desired to open or close said window when no vacuum from the engine is available, it is only necessary to press the hand crank in slightly to make it operative. However, I prefer to use vacuum from tank 23 ordinarily to operate said window when the engine is not running, and to conserve the vacuum in said tank. I prefer to interpose check valve 22a in tube 22 connecting said tank to said engine.

It will be understood that the structure herein described and illustrated is by way of an example of my invention and that many variations thereof may be made without departing from the spirit of said invention.

I claim:

1. In an elevating and lowering mechanism for the window of an automobile door comprising a power cylinder element having a piston operatively engaged to said window, means for supplying operating fluid to said cylinder, a valve for selectively directing and controlling the flow of fluid from said means to said cylinder, and a manually operable handle for opening and closing said window, means for engaging and automatically disengaging said handle from said mechanism when it is not manually manipulated, a lock for said mechanism normally in engagement for preventing operation thereof, said lock being arranged in operative relation to said handle to become disengaged when said handle is manually manipulated, and a piston-and-cylinder control element connected with said lock to disengage it when said power cylinder is actuated.

2. A lock for the elevating and lowering mechanism for the window of an automobile door said mechanism including a power cylinder and piston element, means for supplying operating fluid to said cylinder, a valve for selectively directing and controlling the flow of fluid from said means to said cylinder, a manually operable handle and gear means for opening and closing said window, and means for automatically disengaging said handle from said gear means when it is not manually manipulated, said lock comprising a non-rotatable shaft normally engaging said gear means to prevent rotation thereof, said shaft being adapted to be disengaged from said gear means when said handle engages said gear means, and a control element for disengaging said shaft from said gear means when said power cylinder and piston element is actuated.

3. A lock for the elevating and lowering mechanism for the window of an automobile door said mechanism including a power cylinder and piston element, means for supplying operating fluid to said cylinder, a valve for selectively directing and controlling the flow of fluid from said means to said cylinder, a manually operable handle and gear means for opening and closing said window, and means for automatically disengaging said handle from said gear means when it is not manually manipulated, said lock comprising a non-rotatable shaft normally engaging said gear means to prevent rotation thereof, said shaft being adapted to be disengaged from said gear means when said handle engages said gear means and a control element for disengaging said shaft from said gear means when said power cylinder and piston element is actuated, said control element comprising a fluid operable piston and cylinder adapted to be supplied with fluid through said valve.

ROBERT L. GILL.